United States Patent [19]

Mizukoshi

[11] Patent Number: 4,808,145
[45] Date of Patent: Feb. 28, 1989

[54] TRIPOD TYPE CONSTANT VELOCITY JOINT

[75] Inventor: Yasumaza Mizukoshi, Fujisawa, Japan

[73] Assignee: Nippon Seiko Kabushiki Kaisha, Japan

[21] Appl. No.: 115,986

[22] Filed: Nov. 2, 1987

Related U.S. Application Data

[62] Division of Ser. No. 750,590, Jul. 1, 1985, abandoned.

[30] Foreign Application Priority Data

| Jul. 4, 1984 | [JP] | Japan | 59-137376 |
| Feb. 14, 1985 | [JP] | Japan | 60-25178 |
| Apr. 17, 1985 | [JP] | Japan | 60-80356 |
| Apr. 17, 1985 | [JP] | Japan | 60-80357 |
| May 1, 1985 | [JP] | Japan | 60-92177 |

[51] Int. Cl.$^4$ ............................................. F16D 3/20
[52] U.S. Cl. ........................................ 464/111; 464/905
[58] Field of Search ............... 464/111, 123, 124, 905

[56] References Cited

U.S. PATENT DOCUMENTS

| 2,722,115 | 11/1955 | Dunn | 464/124 |
| 3,204,427 | 9/1965 | Dunn | 464/124 X |
| 4,192,154 | 3/1980 | Nakamura et al. | 464/111 |
| 4,582,502 | 4/1986 | Girguis | 464/111 |

FOREIGN PATENT DOCUMENTS 903609 2/1982 U.S.S.R. ............... 464/111

Primary Examiner—Daniel P. Stodola
Attorney, Agent, or Firm—Elliot M. Olstein; Raymond J. Lillie

[57] ABSTRACT

A tripod type constant velocity joint comprises: a housing including three grooves each of which has curved surfaces opposing each other in a circumferential direction; a shaft inserted into the housing; three trunnions mounted on said shaft and outwardly extending right-angled relative to an axis of said shaft; three rollers movably mounted on said three trunnions; and an aligning member disposed between each of the three rollers and the curved surfaces of each of the three grooves; said aligning member means being movable along the curved surfaces of said groove.

1 Claim, 17 Drawing Sheets

Prior Art

Side acceleration on the vehicle

TRIPOD TYPE CONSTANT VELOCITY JOINT

This is a division of application Ser. No. 750,590, filed July 1, 1985, now abandoned.

BACKGROUND OF THE INVENTION (1) Field of the Invention

This invention relates to tripod type constant velocity joint.

(2) Description of the Prior Art

A conventional tripod type constant velocity joint will be described with reference to FIGS. 1 to 7.

In FIG. 1 symbol H is a cup-shaped housing and symbol S is a shaft. Numeral 1 is a trunnion mounted on the shaft. Symbol R is a spherical roller fitted to the trunnion 1 by a needle 2. Numeral 3 is a stopper and numeral 5 is a support ring. Formed in the housing H are three pairs of grooves 4 extending to an axial direction. The spherical roller R is moved slidably on a cylindrical surface 4a of the groove 4. Mounted between the housing H and the shaft S is a boot which is not illustrated.

Under the aforesaid construction, an axial movement and angular movement of the housing H and the shaft S respectively is feasible at the time when the roller R is moved slidably on the cylindrical surface 4a of the groove 4. A torque transmission in a rotation direction is feasible between the roller R and the groove 4.

Further, when the roller R is moved with a certain joint angle, a contact condition between the spherical roller R and the cylindrical surface of the groove is always constant even for an eccentric movement of the joint, because the roller R is spherical.

In such a constant velocity joint, when the roller R is rolled by torque with a certain joint angle, it is known that an axial force occurs three times per revolution on the shaft S. The cycle of axial force is increased or decreased by the influence of joint angle, torque transmission on the like. Particularly, it occurs frequently in recent high power vehicles. Further, in the event the cycle of axial force corresponds to that of a proper shaking of a vehicle body, suspension or the like and there occurs a large axial force enough to invite resonance of the vehicle body, the inconvenience is that a crew in a vehicle feels uncomfortable lateral shaking. From the viewpoint of a vehicle design, the inconvenience is that the joint angle must be limited to a relatively small one.

To solve such inconvenience, a proposal has been made in UK Patent Application GB No. 2,106,219A. In this reference there are disclosed strip-like members similar to aligning members of this invention. According to this reference, the strip-like members are fixed in the axial sense to the inner component and slidable in the axial direction on the guide groove walls of the outer component. Since a portion of the strip-like member is positioned between the outer component and the spherical roller, and becomes a part of transmit driving force, a large pressure is applied to the strip-like members. Further, axial load fluctuation which occurs periodically is buffered by the strip-like members and maintain equilibrium within the interior of the joint.

A relative axial displacement of the strip-like members and the outer element becomes a slide, so that the most remarkable feature of a slide and tripod type constant velocity joint is that, a friction resistance in a slide direction that is small is lost. That is, the spherical roller is rolled in the guide groove of the outer component. Accordingly, the disadvantage is that friction coefficient is remarkably increased and slide resistance becomes very large.

This invention aims at solving the problems of the aforesaid conventional techniques. More particularly, this invention provides a novel tripod type constant velocity joint which enables to reduce an axial force and prevent resonance of a vehicle body due to the axial force by analyzing the factors for causing the axial force as well as the influence on the axial force.

The result of my analysis is that the axial force is caused by the following three friction resistances; a friction resistance $f_1$ acted on the trunnion 1 when the spherical roller R performs its rolling movement, a friction resistance $f_2$ of the roller R to the groove 4 in the case of the former slides in the axial direction of the trunnion 1, and a friction resistance $f_3$ of the roller R to the trunnion 1 (needle 2) when the roller R slides in the axial direction of the trunnion 1. It has been found that the axial force due to the friction resistances $f_2$ and $f_3$ is large. FIG. 7 shows the results of my analysis on the influence of occurrence of the axial force.

The mechanism of occurrence of the axial force will be described with reference to FIGS. 4 to 7.

FIG. 4 shows the condition of a relative displacement of the roller R at the movement time of the joint relative to the groove 4.

When the roller R moves from a zone [I] to a zone [II] along the cylindrical surface 4a of the groove 4, it is inclined to roll within the zone [I] in an external direction of the groove 4 by the friction resistances $f_2$, $f_3$ within the zone [I], but within the zone [II] in an internal direction thereof by the same friction resistances $f_2$, $f_3$. However, since the roller R is moved being guided along the cylindrical surface 4a of the groove 4, the external force to be balanced with the friction resistances $f_2$, $f_3$ is imposed on the roller R. In FIG. 4, $\theta$ is a joint angle, and K is a rotational surface of the trunnion 1.

It is considered that the external force occurs when a contact point of the cylindrical surface 4a and the roller R is displaced.

In the case the roller R is disposed in the zone [I] as shown in FIG. 4, the contact point A is displaced to a position B as shown in FIG. 5, thereby a component of force Ft of load FA occurs. The component of force Ft is, as shown in FIG. 6, divided into a component of force Ft cos $\theta$ to be balanced with the sum of the friction resistances $f_2$ and $f_3$ and a component of force Ft sin $\theta$ in a direction of the shaft S. Addition of the component of force Ft sin $\theta$ in the shaft direction to the friction resistance $f_1$ appears as the axial force. When the spherical roller R is positioned on a border of the zones [I] and [II] (the position of 90 degree movement of the joint), sin $\theta$ is equal to zero. (sin $\theta$=0). Accordingly, the component of force Ft sin $\theta$ in the axial direction becomes zero, and only the friction resistance $f_1$ appears as axial force. This is a phenomenon of the trunnion 1A, one of three trunnions 1A, 1B and 1C. With regard to the other two trunnions 1B, 1C, respectively, the joint rotational angle is displaced by 120°. Accordingly, the axial force appeared on the shaft S is the sum of respective axial forces of the trunnions 1, 1 and 1 as shown in FIG. 7. Since a force direction of a compression force and of a tensile force is opposing to each other, its difference becomes a resultant axial force.

As described above, my analysis on mechanism of occurrence of the axial force and the influence on the axial force has resulted in that it is required to reduce the friction resistances $f_1$, $f_2$ and $f_3$ in order to solve the problems of the conventional constant velocity joint. However, since the friction resistance $f_1$ becomes small by movement, it is required to reduce the friction resistances $f_2$, $f_3$, that is, the component of force Ft sin $\theta$ in a direction of the shaft S. The reason why the component of force Ft sin $\theta$ occurs might be due to that since the groove 4 has the cylindrical surface 4a as shown in FIGS. 4 to 7 and the surface of the spherical roller R is spherical, in case of joint angle $\theta$ ($\theta > 0$) a contact point of the cylindrical surface 4a and the spherical roller R is displaced out of the plane (rotational surface of the trunnion) including the axial lines of the three trunnions, and a direction of force Ft occurred on the contact point is intersected with the rotational surface K.

SUMMARY OF THE INVENTION

It is a primary object of this invention to provide a tripod type constant velocity joint which comprises aligning member means disposed between each of three rollers and the curved surfaces of each of three grooves in order to prevent resonance of a vehicle body due to an axial force, thereby the resonance function can be eliminated effectively by the aligning movement of the aligning member means as well as the movement of the three rollers.

It is another object of this invention to provide a tripod type constant velocity joint having a small sliding resistance.

It is another object of this invention to provide a tripod type constant velocity joint including aligning members having smooth and stable aligning function.

It is another object of this invention to provide a tripod type constant velocity joint including the aligning members having long durability.

It is a further object of this invention to provide a tripod type constant velocity joint including the aligning members which can be manufactured at a low cost.

More specifically, the tripod type constant velocity joint according to this invention comprises a housing including three grooves each of which has curved surfaces opposing each other in a circumferential direction; a shaft inserted into the housing; three trunnions mounted on said shaft and outwardly extending right-angled relative to an axis of said shaft; three rollers rotatably mounted on said three trunnions; and aligning member means disposed between said three rollers of each and the curved surfaces of each of said three grooves; said aligning member means being movable along the curved surfaces of said groove.

Other and further objects, features and advantages of this invention will be apparent from the following description taken in connection with the accompanying drawings.

BRIEF DESCRIPTION OF THE ACCOMPANYING DRAWINGS

Figure 19:
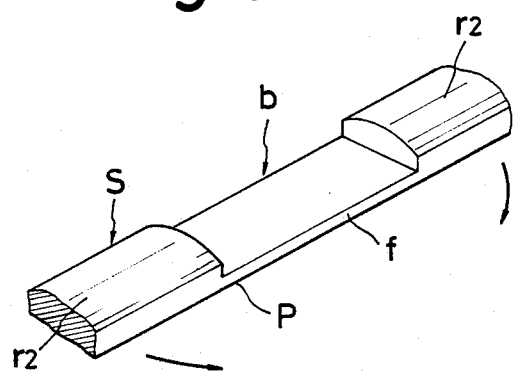
Figure 20:
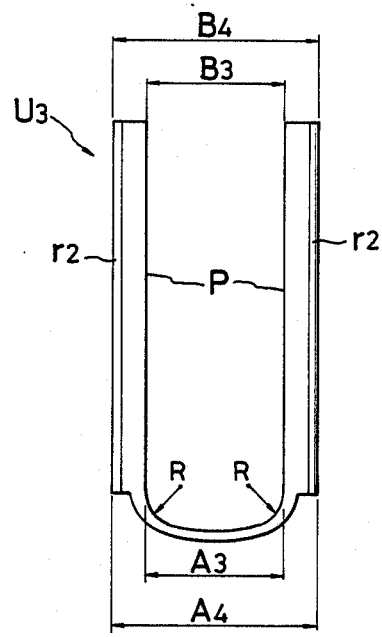

FIGS. 19 and 20 respectively are a perspective view and a side view of a first modification of the aligning member in the third embodiment.

Figure 21:
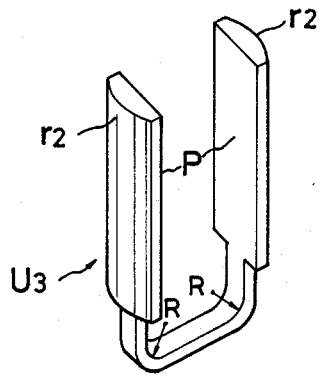

FIG. 21 is a perspective view of a second modification thereof in the third embodiment.

Figure 22:
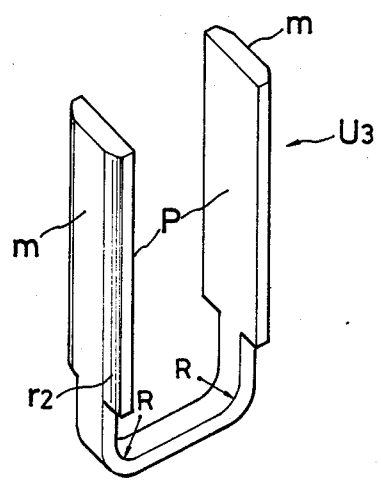

FIG. 22 is a perspective view of a third modification thereof in the third embodiment.

Figure 23:
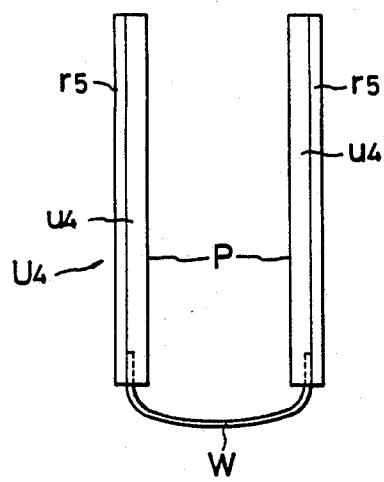

FIG. 23 is a side view of a first modification of an aligning member in a fourth embodiment.

Figure 24:
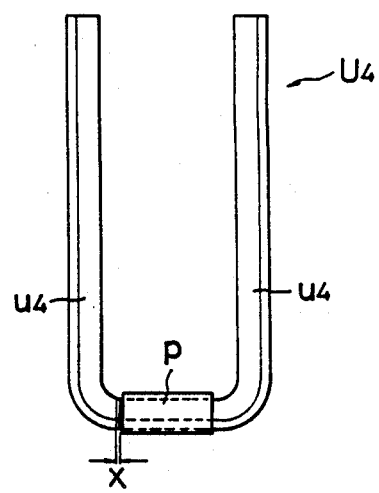

FIG. 24 is a side view of a second modification thereof in the fourth modification.

Figure 25:
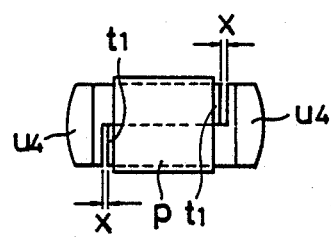

FIG. 25 is a plan view of the aligning member in FIG. 24.

Figure 26:
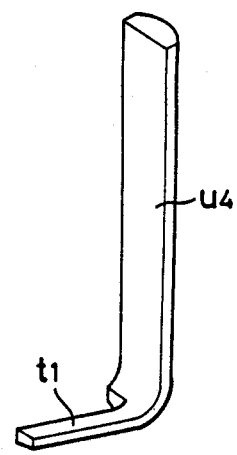

FIG. 26 is a perspective view of the aligning member in FIG. 24.

Figure 27:
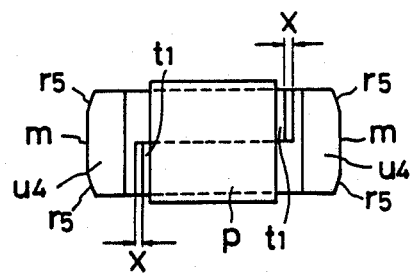

FIG. 27 is a plan view of a third modification of the aligning member in the fourth embodiment.

Figure 28:
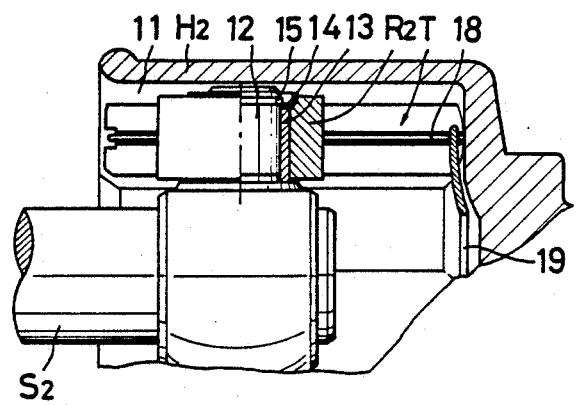

FIG. 28 is a section view of a main part of a fifth embodiment.

Figure 29:
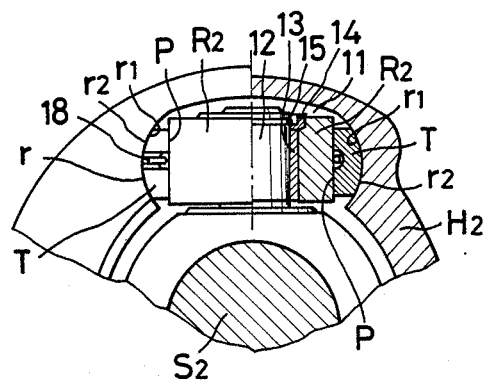

FIG. 29 is a front view of the main part thereof.

Figure 30:
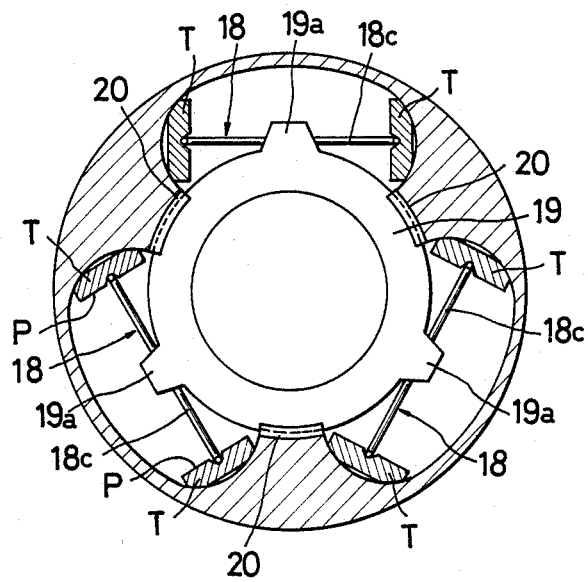

FIG. 30 is a section view of the construction for supporting an aligning member in the fifth embodiment.

Figure 31:
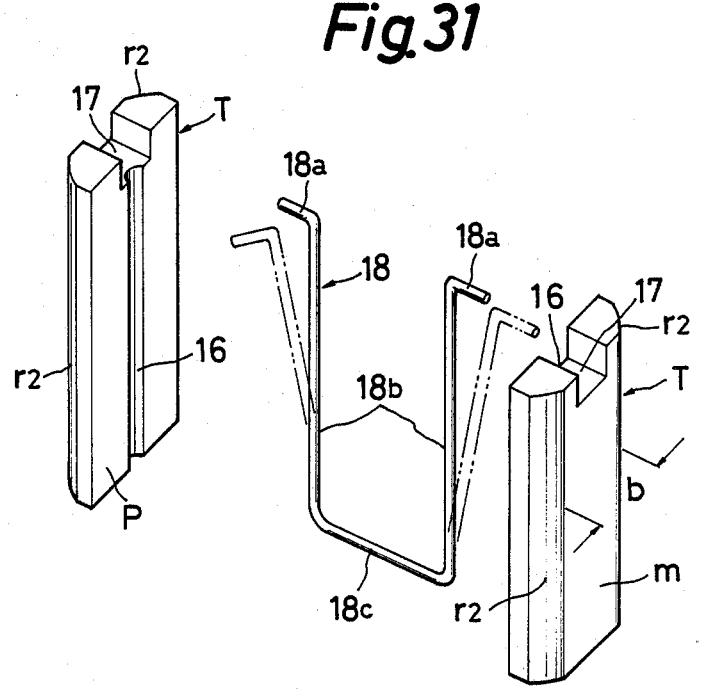

FIG. 31 is an exploded perspective view of the aligning member having two segments in the fifth embodiment.

FIGS. 32 to 35 are views for showing various variations of the aligning member in the fifth embodiment.

Figure 36:
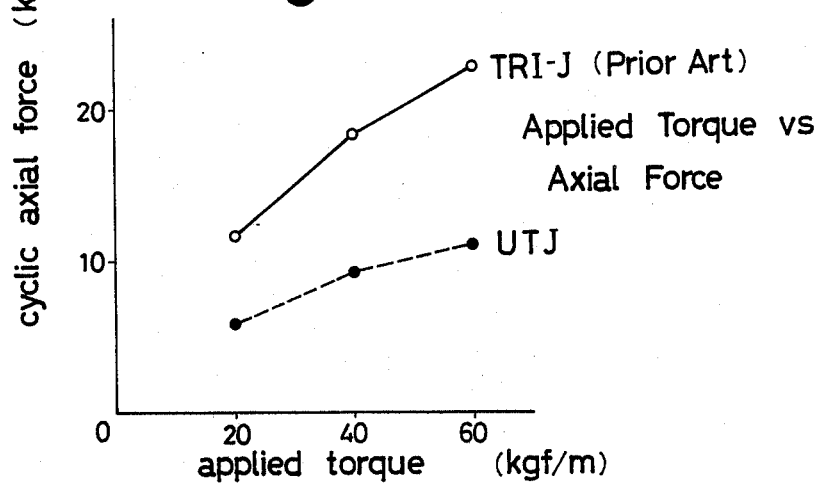

FIG. 36 shows a graph for comparing a resultant axial force of a tripod type constant velocity joint of this invention with that of the prior art.

Figure 37:
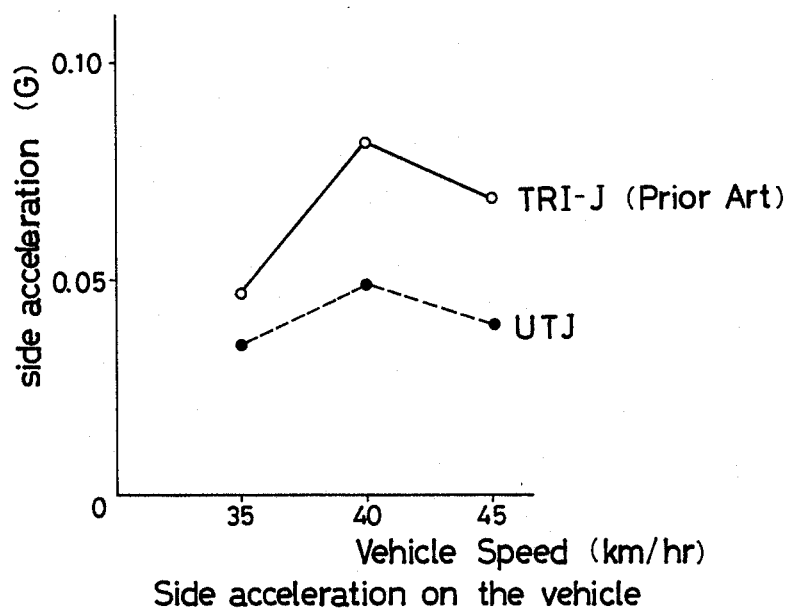

FIG. 37 shows a graph for showing a relationship of an actual vehicle speed and its side acceleration in the present invention and the prior art respectively.

DETAILED DESCRIPTION OF PREFERRED EMBODIMENTS

Embodiment 1

A first embodiment of this invention will be described with reference to FIGS. 8 to 11.

In FIG. 8 to 11 there is shown a cup-shaped housing $H_1$, inside which three grooves 11 are extended in an axial direction.

Symbol $S_1$ is a shaft. Numeral 12 is one of three trunnions mounted on the shaft $S_1$. Symbol $R_1$ is a cylindrical roller movably inserted into the trunnion 12 by means of a needle 13. Numeral 14 is a stopper having a slight clearance in an axial direction of the trunnion 12. Numeral $U_1$ is a U-shaped aligning member which is disposed so as to hold the cylindrical roller $R_1$ between a cylindrical surface $r_1$ as a raceway formed at both side walls of the groove 11 and the cylindrical roller $R_1$.

The surface of the aligning member $U_1$ at the side of the groove 11 is a cylindrical surface $r_2$ sliding with the cylindrical surface $r_1$ of the groove 11, while the surface thereof at the side of the cylindrical roller R is a plane surface P on which the roller $R_1$ is moved arcuately by rotation of the trunnion 12. The U-shaped aligning member $U_1$ is not dismounted in the axial direction from the groove 11, because it is supported by a pair of supporters 15. The aligning member $U_1$ makes a relative movement for the housing $H_1$ within the groove 11 as shown in arrow mark E.

The aligning member $U_1$ is movable relative to the housing $H_1$ within the groove 11 and firmly supported to the housing by a suitable supporting means so that it may not be dropped out.

Such being the case, an axial and angular movement of the housing $H_1$ and the shaft $S_1$ respectively are feasible when the cylindrical roller $R_1$ is moved on the plane surface P of the aligning member $U_1$, and a torque transmission at the movement of the roller $R_1$ is available by way of the aligning member $U_1$ between the cylindrical roller $R_1$ and the groove 11.

Figure 11:
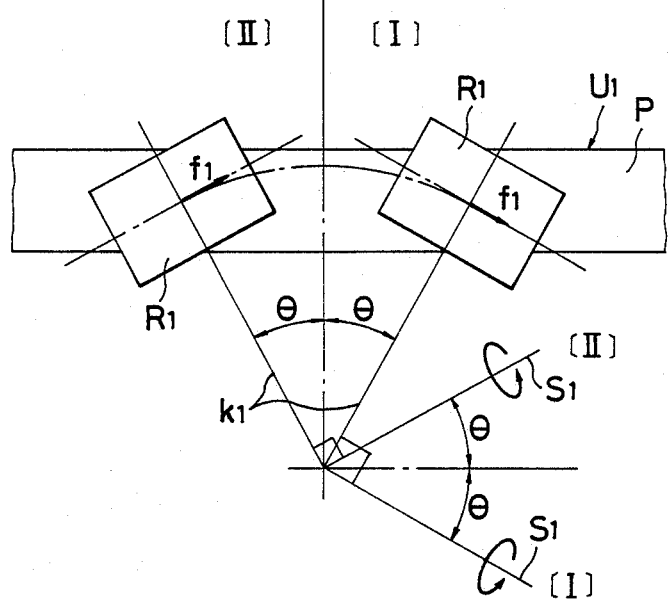
FIG. 11 is a view of an operation of the first example.

When the joint is moved with a joint angle $\theta$ as shown in FIG. 11, the cylindrical roller $R_1$ makes an arcuate movement by rotation of the trunnion 12 and is moved from the zone [I] to the zone [II]. Since the inside of the aligning member $U_1$ contacting the roller $R_1$ is formed by the plane surface P, the roller $R_1$ is moved in an arcuate form upon the plane surface P. In the meantime, the aligning member $U_1$ is moved relatively along the cylindrical surface $r_1$ and follows smoothly an inclination of the cylindrical roller $R_1$. Then, the cylindrical roller $R_1$ does not slide in the axial direction of the trunnion 12, and slidable within such a clearance that no obstacle is given for a slight eccentric movement and rolling at the rotation time of joint. Accordingly, since a contact line of the cylindrical roller $R_1$ and the aligning member $U_1$ always corresponds to a contour of the cylindrical roller $R_1$, a direction of force arising on the contact line always exists within the plane surface (a rotational surface $K_1$ of the trunnion) including the axes of the three trunnions 12, so that any axial force does not occur and a friction resistance to be affected by the axial force nearly disappears.

Further, an axial displacement of the shaft $S_1$ toward the housing $H_1$ is feasible when the cylindrical roller $R_1$ is moved on the plane surface P of the aligning member $U^1$, so that a sliding friction hardly occurs between the roller $R_1$ and the aligning member $U_1$.

As described above, according to this embodiment the U-shaped aligning member is mounted between the cylindrical roller and the groove, and movable relative to the housing. Further, a contact surface of the aligning member and the cylindrical roller is plane and the aligning member is moved relative to the cylindrical roller. Such being the case, when the joint is moved with a certain joint angle, a center of the joint may make an eccentric movement, and the contact surface of the cylindrical roller and the aligning member becomes uniform, thereby the friction resistances f2, f3 are reduced and a component of force Ft sin $\theta$ in the axial direction of the shaft S does not occur. Accordingly, it is possible to prevent resonance of the vehicle body due to occurrence of the axial force.

Further, even if the shaft is displaced axially relative to the housing, the aligning member does not slide in the axial direction on the groove, so that a sliding resistance to the axial direction due to movement of the cylindrical roller can be maintained to a lower level.

Figure 1:
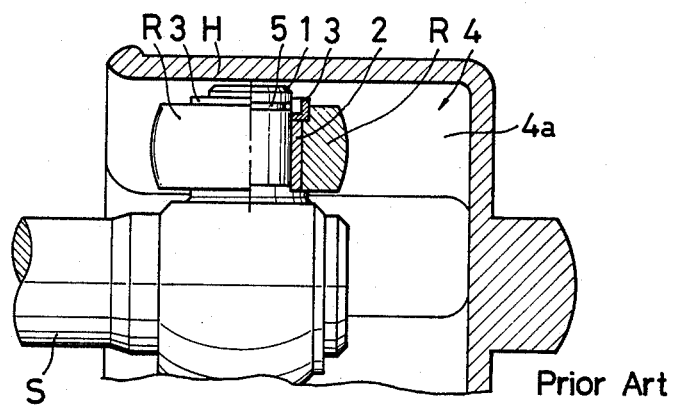
FIG. 1 is a section view of a main part of a conventional tripod type constant velocity joint.
Figure 2:
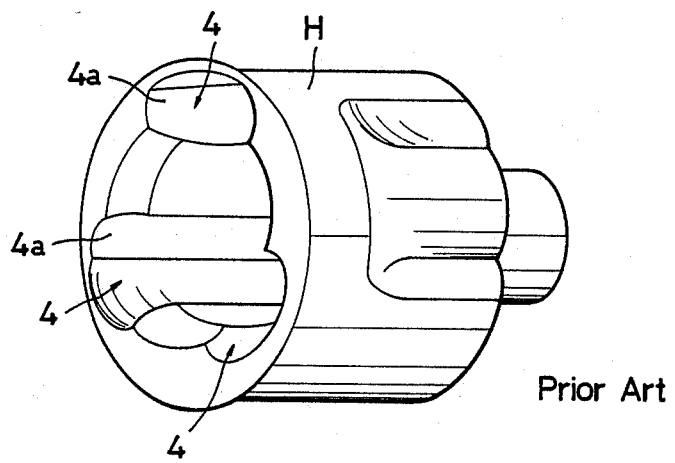
FIG. 2 is a perspective view of a housing in the conventional joint.
Figure 3:
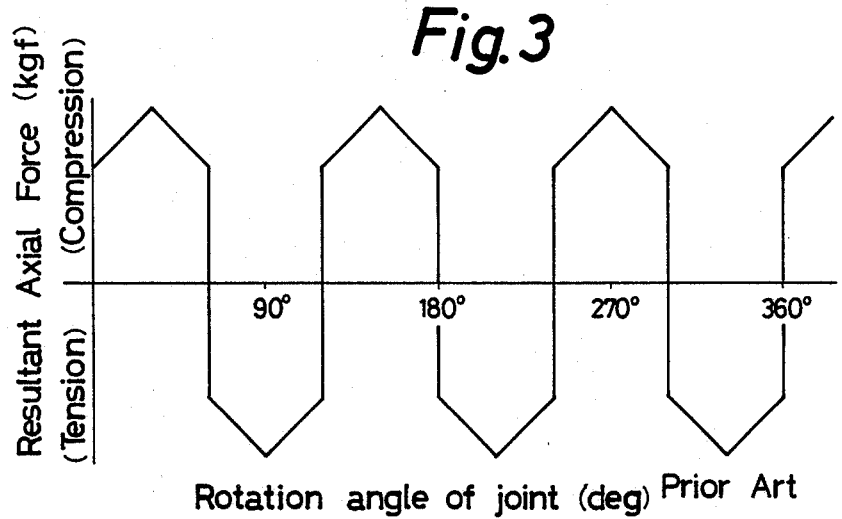
FIG. 3 shows a relationship of a rotation angle with an axial force in the conventional joint.
Figure 4:
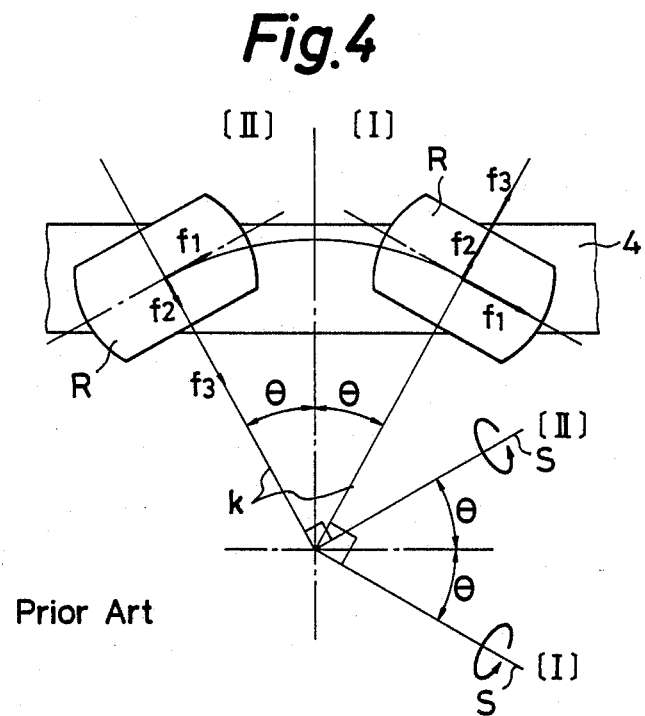
FIG. 4 shows a relative displacement of a spherical roller and a groove at the time when the conventional joint is moved.
Figure 5:
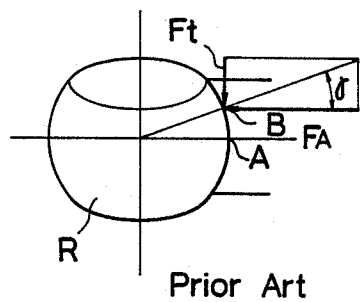
FIG. 5 shows mechanism of occurrence of an axial force in the conventional joint.
Figure 6:
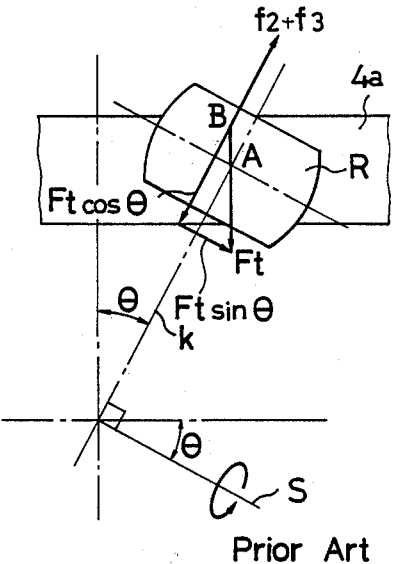
FIG. 6 shows mechanism of occurrence of the axial force in the conventional joint.
Figure 7:
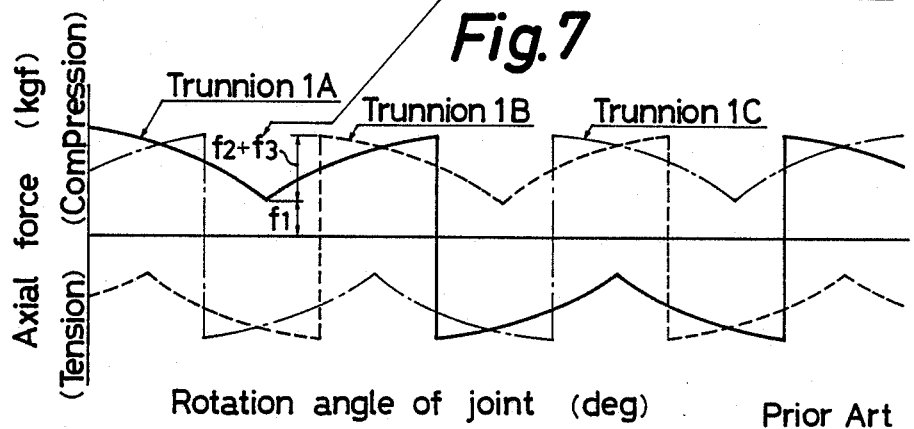
FIG. 7 shows an analytic chart of occurrence of the axial force in the conventional joint.

FIG. 36 shows the measured result of the resultant axial force occurred when a certain torque is applied for a drive shaft assembly using a tripod type constant velocity joint. It was measured by a suitable test device. In FIG. 36 "TRI-J" indicates a conventional tripod type constant velocity joint (as shown in FIGS. 1 and 2), while "UTJ" indicates a novel tripod type constant velocity joint according to the first embodiment of this invention.

As obviously shown in FIG. 36, the resultant axial force of the applied torque in this invention is about half as low as that in the conventional joint.

FIG. 37 shows the measured results of relationship of vehicle speed with side acceleration in an actual vehicle and confirms the correctness of the measured test results in FIG. 36.

As obviously shown in FIG. 36, it has been found that the side acceleration in this invention is lower and more stable than that in the conventional joint. Particularly, at a vehicle speed of 40 Km to 45 Km per hour, a crew in a cabin does not feel a side shaking. Thus, it has been found that drive feeling is improved greatly.

Embodiment 2

A second embodiment of this invention will be described with reference to FIGS. 12 to 17.

According to a remarkable aspect of this embodiment, even if the radius of curvature of a cylindrical surface $r_2$ of the aligning member $U_1$ is smaller than that of a cylindrical surface $r_1$ of the groove 11 (provided that the respective radius of curvature is within the allowable accuracy of dimension), the aligning member can perform a very suitable aligning function.

Figure 12:
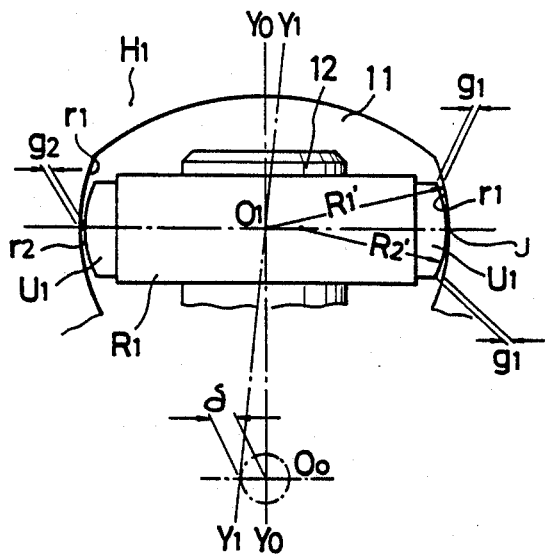
FIG. 12 is a front view of a main part of a second example, in which the function of an aligning member is described.

As shown in FIG. 12, when a radius of curvature $R_2'$ of the cylindrical surface $r_2$ of the aligning member $U_1$ is lower than a radius of curvature $R_1'$ of the cylindrical surface $r_1$ of the groove 11, and axis of the trunnion 12 exists on line $Y_0$-$Y_0$ the cylindrical surface $r_2$ of the aligning member $U_1$ is vertical relative to the axial line $Y_0$-$Y_0$ and contacts the cylindrical surface $r_1$ of the groove 11 at the load side (torque transmission side) at a linear J point passing through $O_1$, a center of curvature of the cylindrical surface $r_2$. At both sides of J point, there occur, gaps $g_1$ and $g_2$ between the two cylindrical surfaces $r_1$ and $r_2$. At the opposite side i.e. non-load side, there occurs a gap $g_2$ between the cylindrical surfaces $r_1$ and $r_2$.

Figure 13:
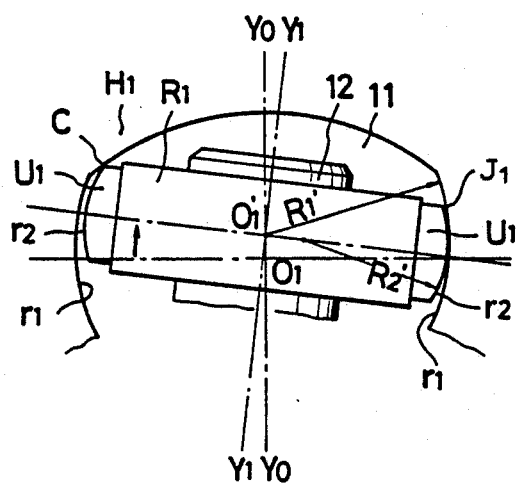
FIGS. 13 and 14 are front views of the main part of the second example.

Under such circumstances, when the joint is moved with a certain joint angle, the axial line $Y_0$—$Y_0$ of the trunnion 12 is inclined up to a position of $Y_1$—$Y_1$ at maximum due to eccentric amount $\delta$ of a joint center $O_0$ which is a proper feature of the tripod type constant velocity joint. Since the trunnion 12 and the cylindrical roller $R_1$ having it are inclined at the same angle, a load distribution of a contact surface of the cylindrical roller $R_1$ and the aligning member $U_1$ is transferred from a uniform condition to an outer side of the width of the aligning member $U_1$. As a result, the aligning member $U_1$ is not moved about a center $O_1$ of the trunnion 11. As shown in FIG. 13, the aligning member $U_1$ is not slid inwardly of the cylindrical surface of the groove 11, and contacts a side end $J_1$.

Another end (non-load side) of the aligning member $U_1$ having no relation with torque transmission is displaced outwardly, because there is a gap $g_2$ between the groove 11 and the aligning member $U_1$. When a design of the groove is modified, an end of the aligning member may contact an inner wall of the housing $H_1$ at a position C.

Under such circumstances, a relative movement of the aligning member $U_1$ toward the groove 11 is limited and the aligning quantity becomes small. In this case, it is possible to enlarge the inner wall of the housing outwardly, but the housing $H_1$ is enlarged in a radial direction and its weight is increased. Therefore, it is disadvantageous.

In such a case, the aligning member according to the second embodiment can perform a stable and effective aligning function.

Figure 9:
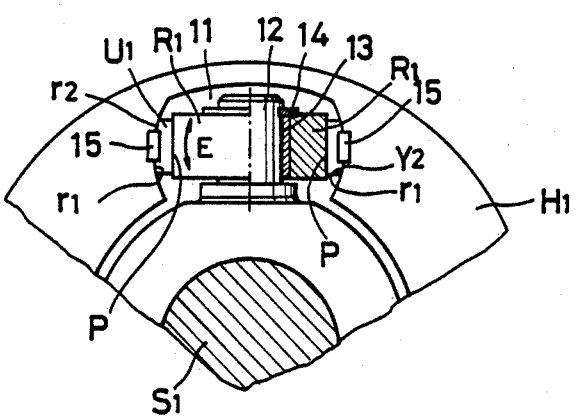
FIG. 9 is a front view of a main part of the first example.
Figure 14:
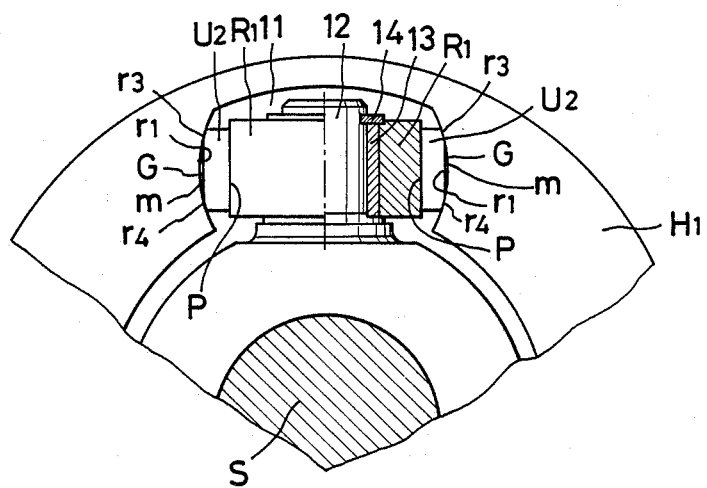
Figure 15:
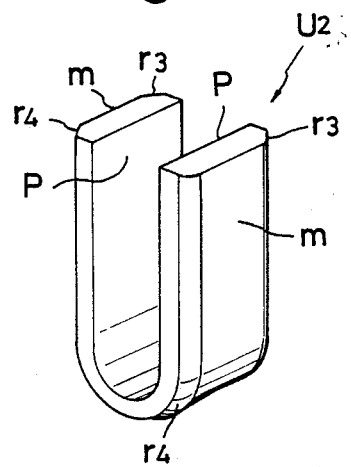
FIG. 15 is a perspective view of an aligning member in FIG. 14.

FIG. 14 shows a front view of the second embodiment corresponding to FIG. 9 and FIG. 15 shows a perspective view of the aligning member $U_2$ in FIG. 14.

According to the second embodiment, the aligning member $U_2$ is, on the cylindrical surface $r_2$ of the aligning member of the first embodiment, provided with a non-contact portion m which has no contact with the cylindrical surface $r_1$ of the groove 11. The non-sliding portion m is formed with a same width in a longitudinal direction on a center portion of the cylindrical surface $r_2$. After that, it(m) is bent in a U-shape as shown in FIG. 15. Both sides of the non-contact portion m are, in parallel with each other, formed at $r_3$ and $r_4$.

As will be discussed hereinafter, the width b of the non-contact portion m is defined so as to satisfy the following formula.

$$b > 2R_1' \cdot \mu \cdot \frac{a + \sqrt{1 + (1 - a^2)\mu^2}}{1 + \mu^2}, \quad (1)$$

wherein $R_1'$ is a radius of curvature of the cylindrical roller $r_1$ of the groove 11, $\mu$ is a sliding coefficient of the friction resistance of the aligning member $U_2$ and the groove 11, a is a reduction coefficient of the friction resistance between the aligning member $U_2$ and the cylindrical roller $R_1$, thereby $a \leq 1$ is obtained.

This is a condition that the aligning member $U_2$ is surely slidable on the cylindrical surface $r_1$ of the groove 11. In other words, the aligning member $U_2$ is movable on the cylindrical surface $r_1$ under the condition that a curvature center $O_1$ of the cylindrical surface $r_1$ of the groove 11 and a curvature center $O_1'$ of the cylindrical surfaces $r_3$, $r_4$ of the aligning member $U_2$ are on the nearly same position.

The aforesaid formula has been solved as follows.

Figure 16:
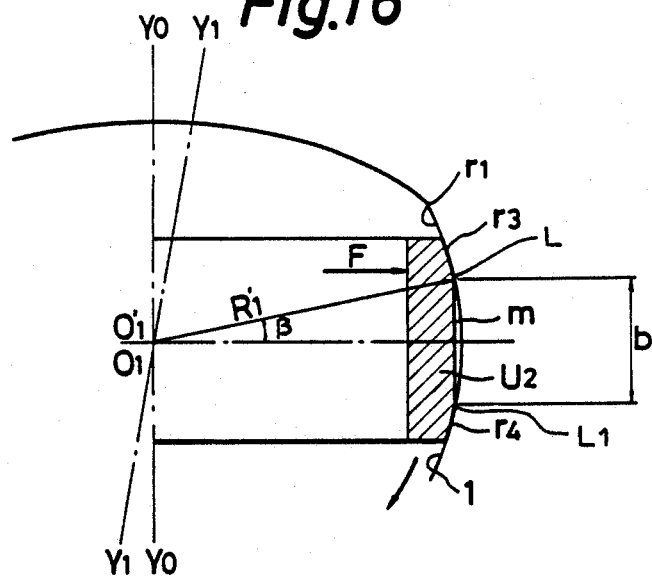
FIGS. 16 and 17 are views of the function of the aligning member in the second example.
Figure 17:
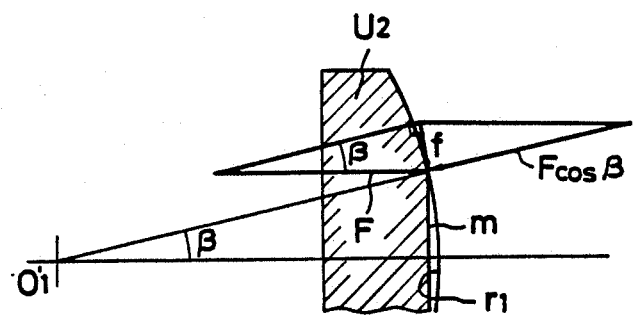

As shown in FIGS. 16 and 17, the width of the non-sliding portion of the aligning member $U_2$ is expressed with b and the aligning member $U_2$ is slidable with the groove 11 on the cylindrical surfaces $r_3$ and $r_4$.

When a force F is applied for the aligning member $U_2$ at a contact point L of an inner end of said cylindrical surface $r_3$ and the cylindrical surface $r_1$, a sliding force f is expressed with the following formula:

$$f = F \sin \beta \quad (2)$$

accordingly, $$\sin \beta = \frac{b}{2R_1} \quad (3)$$

wherein $\beta$ is vertical relative to axis line $Y_0$—$Y_0$ of the trunnion when the joint angle is zero, and a surface for connecting a surface passing a curvature center $O_1$ of the cylindrical surface $r_1$, a curvature center $O_1$ and the aforesaid point $L_1$, respectively.

In order that the aligning member may be moved about the curvature center $O_1'$ of the cylindrical surfaces $r_3$, $r_4$, a sliding force f is to be larger than the sum of (i) a friction resistance $F \cdot \mu a$ of the aligning member $U_2$ vs. the cylindrical roller (a relative movement of the aligning member with the cylindrical roller is a rolling slide, the then friction coefficient is smaller than the sliding friction coefficient $\mu$, and becomes a corrected value $\mu a$ by multiplying the reduction coefficient a) and (ii) a friction resistance $F \cdot \cos \beta \cdot \mu$ of the aligning member $U_2$ vs. the groove 11.

Namely, the following formula must be satisfied.

$$f > F \cdot \mu a + F \cdot \cos \beta \cdot \mu \quad (4)$$

In compliance with formula (2), $$\sin \beta > \mu(a + \cos \beta) \quad (5)$$

In compliance with formula (3), $$b > 2R_1' \cdot \mu \cdot (a + \cos \beta) \quad (6)$$

Accordingly $$\cos \beta = \frac{1}{R_1'} \sqrt{R_1'^2 - \frac{b^2}{4}}$$

Formula (6) is changed as follows.

$$b - 2R_1' \cdot \mu a > 2\mu \sqrt{R_1'^2 - \frac{b^2}{4}} \quad (7)$$

When squaring both sides of formula (7), $$b > 2R_1' \cdot \mu \cdot \frac{a + \sqrt{1 + (1 - a^2)\mu^2}}{1 + \mu^2}$$

Accordingly, $0 \leq a \leq 1$

However, in case of a rolling slide of the joint according to this invention, empirically $0.5 \leq a \leq 1$. [Refer to KIKAIKOGAKU BINRAN (Guide to Mechanical Engineering), Revised 6the edition, chapter 5, 5.3 Rolling and sliding friction.]

According to this embodiment, the aligning member $U_1$ is provided with the non-siding portion whose width b is predetermined so as to satisfy the aforesaid formula (1). Accordingly, the aligning member $U_2$ slides on the cylindrical surface $r_1$ of the groove 11 having the cylindrical surfaces $r_3$ and $r_4$ and moves about the curvature center $O_1$.

Namely, as shown in FIG. 16, when the joint is moved with a certain joint angle, an axis line of the trunnion 2 is tilted to $Y_1-Y_1$ relative to the groove of the housing and the cylindrical roller $R_1$ is going to move in an arrow direction. Then, the aligning member $U_2$ is subject to a certain sliding force at a load side, i.e. a side subject to the force F. When it is transformed into the sliding force f, the aligning member $U_2$ slides on the cylindrical surface of the groove 11 and moves about the curvature center $O_1$. As a result, a non-load side of the aligning member $U_2$ does not interfere with an inner wall of the housing $H_1$, so that an aligning amount of the aligning member $U_2$ can maintain stability within a given scope.

Further, according to this embodiment, since the aligning member is provided with the non-sliding portion m having the width b, a gap G arising between the cylindrical surface $r_1$ of the groove 11 and the cylindrical roller $R_1$ can be employed as a grease reservoir, thereby a slide movement of the aligning member $U_2$ becomes easier.

Further, as the value of $\mu$ is smaller, the aligning member slides more smooth. Therefore, it is effective to carry out a superficial treatment for reducing the friction coefficient on the whole or partial surface of the cylindrical roller, the aligning member, the groove or the like.

According to the second embodiment, the aligning member is provided with the non-sliding portion, thereby sliding of the aligning member relative to the groove hardly arises. Thus, it is feasible to obtain a tripod type constant velocity joint having a stable aligning function of the aligning member.

Embodiment 3

A third embodiment of this invention will be described with regard to FIGS. 18 to 22.

This embodiment relates to a modification of a curved portion of the U-shaped aligning member. Since the construction of this embodiment is the same as that of the first example except for the aligning member, I will describe the construction of only the aligning member.

Figure 10:
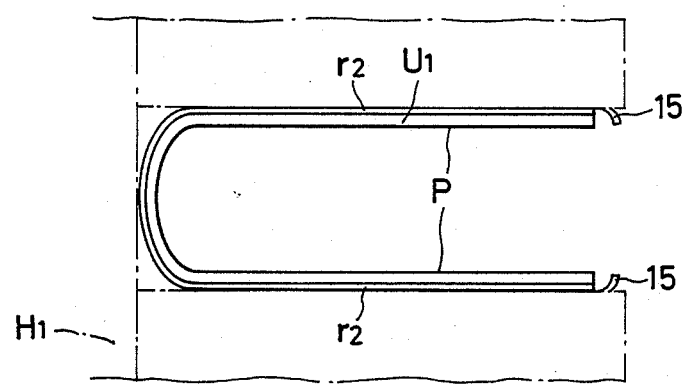
FIG. 10 is an enlarged view of an aligning member in the first example.
Figure 18:
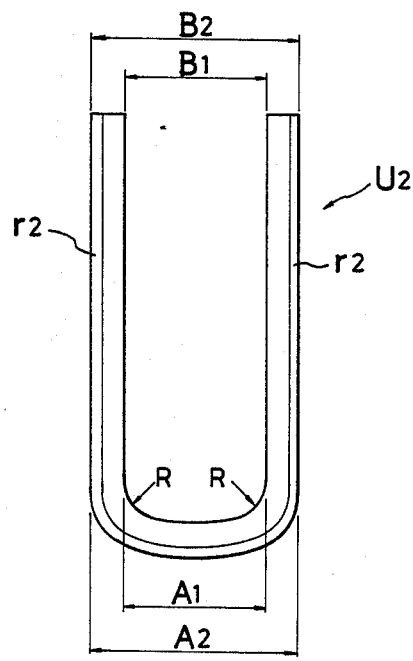
FIG. 18 is a side view of an aligning member of a third embodiment.

The aligning member as shown in FIG. 10 is fabricated in U-shape as shown in FIG. 18. The former in FIG. 10 has a cylindrical surface $r_2$ contacting the cylindrical surface $r_1$ of the groove 11 and a plane surface P contacting the cylindrical roller R. The construction of this embodiment is effective for the production of a heat-treated aligning member which can withstand a large load at the actuation time of the joint. Generally, a dimensional unbalance due to bending treatment as well as heat treatment has been unavoidable to some extent. As shown in FIG. 18, the inner and outer sides $A_1$, $A_2$ at a curved portion are different from the inner and outer sides $B_1$, $B_2$ at a free end, so that it is difficult to obtain a uniform dimension of the aligning member. Under such circumstances, when the dimension of the inner and outer sides $A_2$, $B_2$ is larger than a distance between the cylindrical surfaces $r_1$, $r_2$ of the groove, a pressure is applied for the mounted aligning member $U_1$ thereby resistance is increased at the rotation time of the joint and the aligning member does not work smoothly. Further, when the dimension of the inner and outer sides $A_1$, $B_1$ is smaller than that of the cylindrical roller R, a smooth rolling of the cylindrical roller R is prevented, thereby the reducing effect of the axial force is lost. Such phenomenon is caused by the aforesaid dimensional unbalance. In addition, it is caused by the reason that rigidity of the roller R is too high.

According to the third embodiment, when fabricating a material in U-shape, a sectional area of the curved portion is to be small. Thus, it is possible to provide a tripod type joint velocity joint which brings about a smooth actuation of the joint and displays the reducing effect of the axial force.

Figure 8:
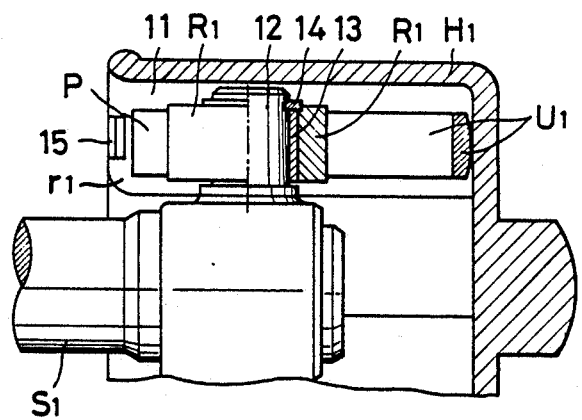
FIG. 8 is a section view of a first example of a tripod type constant velocity according to this invention.

The third example will be described with reference to FIGS. 19 and 20 while referring to FIGS. 8 and 9.

As shown in FIG. 19, a material s having the cylindrical surface $r_2$ contacting the cylindrical surfaces $r_1$, $r_1$ of the groove 11 and the plane surface P contacting the cylindrical roller R is cutaway with a certain thickness at a portion b to be bent, thereby a portion f having a small thickness is formed and its sectional area becomes small. Such material S is bent into U-shaped as shown in FIG. 20.

Since the thin portion f having low rigidity is bent before the heat treatment, the bending work becomes so easy that it is feasible to make uniform the dimensions of the inner and outer sides at the bending portion as well as at the free end and also to correct or modify them. As shown in FIG. 20, it is possible to determine accurately the dimensions of the inner and outer dimensions $A_3$, $A_4$ at the bending portion as well as those of the inner and outer dimensions $B_3$, $B_4$ at the free end.

In addition, a certain pressure to the aligning member $U_3$ is nearly removed. Even if a certain pressure is applied to it, the thin portion is deformed easily, thereby a dimensional error is absorbed to some extent. Accordingly, a rotational movement of the joint is carried out smoothly.

FIG. 21 shows another modification of the U-shaped aligning member $U_3$ according to the third embodiment.

As shown in FIG. 21, a width of the portion to be bent is narrowed and its sectional area becomes smaller. The example of FIG. 21 has the same function and effect as that of FIG. 20. FIG. 22 shows an example of the aligning member having the non-sliding portion m on the cylindrical surface $r_2$ as shown in FIG. 15.

Embodiment 4

A fourth embodiment of this example will be described with reference to FIGS. 23 to 27.

According to this embodiment, a U-shaped aligning member $U_4$ is divided into two segments. The other construction is the same as the tripod type constant velocity joint of the first embodiment.

FIG. 23 shows a first modification of the aligning member $U_4$ of this embodiment, in which a pair of segments $u_4$, $u_4$ are provided. Symbol $r_5$ is a cylindrical surface contacting the cylindrical surface $r_1$ of the groove 11. Symbol p is a contact surface with the cylindrical roller R and forms a plane surface. Each of the two segments $u_4$ is obtained by drawing a material having the cylindrical surface $r_5$ and the plane surface p. Each segment $u_4$ is transformed into a straight member by cutting. Symbol W is a bent U-shaped flat spring having light springiness. An end of the each segments $u_4$ is provided with a hole, thereby two ends of the flat spring W are fixedly inserted into and two holes of the two segments $u_4$. Accordingly, the pair of segments $u_4$ as the aligning member are fixed with each other by means of the flat spring W so as to be moved relatively.

Further the U-shaped aligning member $U_4$ is of a slightly open type. When fitting such aligning member $U_4$ in the groove 11, the cylindrical surface $r_5$ thereof contacts lightly the cylindrical surface $r_1$ of the groove 11.

As described above, the pair of segments $u_4$ are linked with each other by the flat spring W so as to enable relative movement. If such a function is satisfied, the joint method and shape of the pair of segments $u^4$ may be modified optionally. Further, a distance between the cylindrical surfaces $r_5$ and $r_5$ of the pair of segments $u_4$ must be equal to that between the cylindrical surfaces $r_1$ and $r_1$ of the groove 11, so that the flat spring W has in advance a certain curvature.

When fitting such aligning member $U_4$ in the groove 11, it is pressed lightly to the cylindrical surfaces $r_1$, $r_1$ with no gap. Accordingly, any pressure having more springiness than the flat spring W is not applied for the aligning member $U_4$, so that the joint is moved smoothly.

The accuracy of thickness of the pair of segments $u_1$ can be cold-molded so as to conform with a distance between the cylindrical surface $r_1$ of the groove 11 and the cylindrical roller $R_1$. Further, since each segment $u_1$ is a straight member, no deformation due to heat treatment will occur. Accordingly, when the U-shaped aligning member $U_4$ is mounted in the groove 11, a dimension between the plane surfaces p and p of the two segments $u_4$ can be set accurately. Namely, it is possible to control smaller a gap between the pair of segments $u_4$ and the cylindrical roller $R_1$. In addition, such U-shaped aligning member $U_4$ has a simple profile, it can be manufactured at a low cost.

At any rate, since the pair of segments fixed with each other by the flat spring W is movable relatively, any slight deformation thereof prior to mounting may be adjusted by springiness of the flat spring W. Because the then springiness is moderate, the aligning member $U_4$ can maintain a good aligning function.

FIGS. 24 to 26 shows a second modification of the aligning member of the fourth embodiment.

As shown in FIG. 26, a bending portion of a rightside segment $u_4$ is partially cutaway, thereby a lug $t_1$ is formed, while that of a leftside segment $u_4$ is also partially cutaway, thereby both segments $u_4$ are fitted each other and fixed together by a connecting steel tube P so as to enable relative movement. In order to vary a gap between the both segments $u_4$, a clearance X is arranged. A relative displacement of the two segments $u_4$ is possible within the connecting tube P' in which both lugs $t_1$ are connected with each other. The function and effect of the second modification are the same as those of the first modification.

FIG. 27 shows a third modification of the fourth embodiment, in which the cylindrical surface $r_3$ in the third modification is provided with the non-sliding portion m like the example in FIG. 15. Likewise, it is of course possible to provide the aligning member $U_4$ with the non-sliding portion m.

Embodiment 5

A fifth embodiment of this example will be described with reference to FIGS. 28 to 35.

Figure 35:
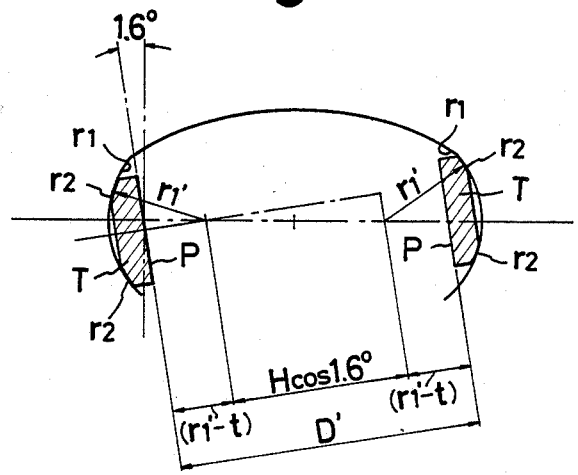

In FIGS. 28 and 35 symbol $H_2$ is a cup-shaped housing, inside which three grooves are formed in the axial direction. Symbol $S_2$ is a shaft and numeral 12 is one of three trunnions mounted on the shaft $S_2$. Symbol $R_2$ is a cylindrical roller movably inserted into the trunnion 12 by way of the needle 13. Numeral 14 is the stopper having a slight clearance in the axial direction of the trunnion 12. Numeral 15 is the supporter. Symbol T is an aligning member which is divided into two segments disposed between the cylindrical surface $r_2$ and the cylindrical roller $R_2$.

The aligning member is provided with cylindrical surfaces $r_2$, $r_2$ contacting the cylindrical surface $r_1$ of the groove 11 and the plane surface P on which the cylindrical roller $R_2$ is movable arcuately by rotation of the trunnion 12. Accordingly, each aligning member T in each groove 11 is, on the cylindrical surfaces $r_2$, $r_2$, movable relative to the cylindrical surface $r_1$ of the groove 11.

Figure 32:
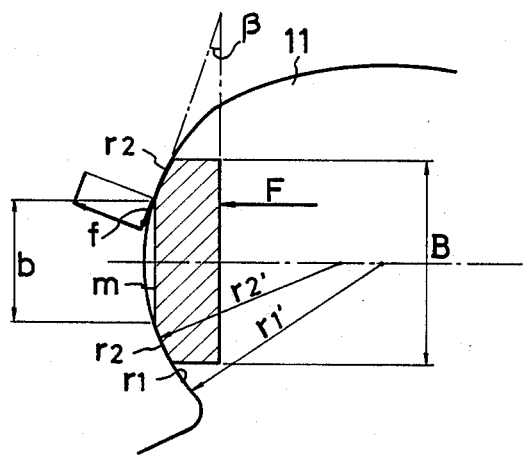
Figure 33:
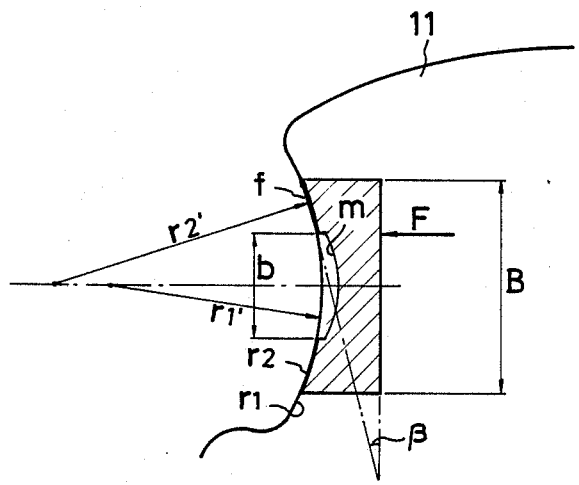

Whereas the cylindrical surface $r_1$ of the groove 11 is concave as shown in FIG. 32, that is convex as shown in FIG. 33. In the former case the cylindrical surface $r_2$ of the aligning member T is convex, while in the latter case that is covex. Any combination is acceptable, but the former combination is more preferable in view of manufacture.

When defining a radius of the cylindrical surface r of the groove 11 as $r_1'$ and a radius of the cylindrical surface $r_2$ of the aligning member T as $r_2'$, the relative movement of the cylindrical surface $r_2$ relative to the cylindrical surface $r_1$ indicates a different aspect in case of $r_1'=r_2'$ and $r_1'\neq r_2'$ respectively. Each different aspect will be described with reference to FIGS. 28 to 33.

In case of $r_1'=r_2'$, the relative movement of the cylindrical surface $r_2$ relative to the cylindrical surface $r_1$ becomes "sliding". Then, when the joint is moved at a certain angle ($\theta>0$), a center of spider is moved eccentrically, thereby the axis of the trunnion 12 is tilted to the groove 11 and the roller $R_2$ fitted thereto is also tilted. Accordingly, it is required to tilt the plane surface P of the aligning member T held between the cylindrical surface $r_1$ and the cylindrical surface $R_2$ so as to follow the inclination of the cylindrical roller 2.

From this point of view, an angle $\beta$ (a holding angle of the aligning member T) of a surface containing a plane surface P of the aligning member T relative to a tangent line drawn on a tangent line of the cylindrical surface $r_1$ and the cylindrical $r_2$ must be more than the angle to cause a component of force f, i.e. "sliding" enough to withstand a sliding and friction resistance of the aligning member T. When the width B of the aligning member T is limited, 0 the radius $r_1'$ is also limited to obtain the holding angle $\beta$ of the aligning member T.

Symbol m is a non-sliding portion so as to avoid sliding with the cylindrical surface $r_1$ of the groove 11, which is formed e.g. when drawing and fabricating the aligning member T. The non-sliding portion m is extended with the same width b in a width direction of the aligning member T. Accordingly, two cylindrical surfaces $r_2$, $r_2$ are formed in parallel with each other at both sides of the nonsliding portion m, and perform the function of the sliding surface with the cylindrical surface $r_1$ of the groove 11. When the holding angle $\beta$ is smaller, the non-sliding portion m does not bring about sliding. To avoid it, the two cylindrical surfaces $r_2$, $r_2$ are formed.

Therefore, the contact surface of the aligning member T and the cylindrical surface of the groove 11 appears on the cylindrical surfaces $r_2$, $r_2$ at the both sides of the aligning member T. It is required to determine suitably the width B of the aligning member T and the width b of the non-sliding portion m in view of contact surface pressure, friction or the like. When the width b has been defined in this way, $r_1'$ is expressed by the following formula.

$$r_1' < \frac{b}{2\mu(1 + \cos \beta)}$$

Wherein $\mu$ is a friction coefficient of the aligning member relative to the cylindrical surface $r_1$ and the cylindrical roller R when the aligning member slides.

However, as $r_1'$ and $r_2'$ become smaller, a contact area of the cylindrical surface $r_1$ and the cylindrical surfaces $r_2$, $r_2$ becomes smaller, thereby the contact surface pressure becomes larger. Accordingly, it is required to determine suitably the width b considering the aforesaid condition.

Further, when the cylindrical surface $r_1$ is concave, a sliding direction of the aligning member T toward the inclination of the trunnion 12 is same, while when the cylindrical surface $r_1$ is convex, a sliding direction thereof toward that of the trunnion becomes reverse.

In case of $r_1' \neq r_2'$, the following aspect is made.

When the cylindrical surface $r_1$ is concave and the cylindrical surface $r_2$ is convex, $r_1' > r_2'$. In case of a contrary combination, $r_2' > r_1'$.

When the holding angle $\beta$ of the aligning member T is smaller than the angle enough to make the aligning member T slide, the cylindrical surface $r_2$ does not slide on the cylindrical surface $r_1$ and makes a relative movement. Due to this movement, the plane surface P of the aligning member T is tilted in the same way as the sliding case and can follow the inclination of the cylindrical roller $R_2$. Further, it is possible to transform $r_1'$ in the former combination and $r_2'$ in the latter combination into a limitless radius i.e. a plane surface.

In case of movement, it is required to dispose a rolling portion as a continuous cylindrical surface on the aligning member without forming the non-sliding portion m.

As discussed above, in either sliding or movement, it is required that the plane surface P of the aligning member T is to follow the inclination of the cylindrical roller $R_2$. Accordingly, the necessity that the cylindrical surface $r_1$ and the cylindrical surfaces $r_1$, $r_2$ are accurate cylindrical profile from the geometrical point of view is not always required. If the plane surface P follows the inclination of the cylindrical roller $R_2$, the cylindrical surfaces $r_1$ and $r_2$, $r_2$ may be a tubular surface at section of a secondary curved line. Further, it is not necessary to position a curvature center of radius $r_1'$ and radius $r_2'$ on the axis of the trunnion 12. Preferably, the curvature center thereof is positioned between the axis of the trunnion 12 and the groove 11.

A distance D between the two plane surfaces P of the two segments of the aligning member T is variable when the aligning member is tilted. The problem is whether the distance D will interfere with an outer diameter of the cylindrical roller $R_2$. Namely, a difference between the two plane surfaces P of the aligning member T and the outer diameter of the non-inclined cylindrical surface $R_2$ is much smaller than an initial gap. Therefore, such problem will not arise.

Figure 34:
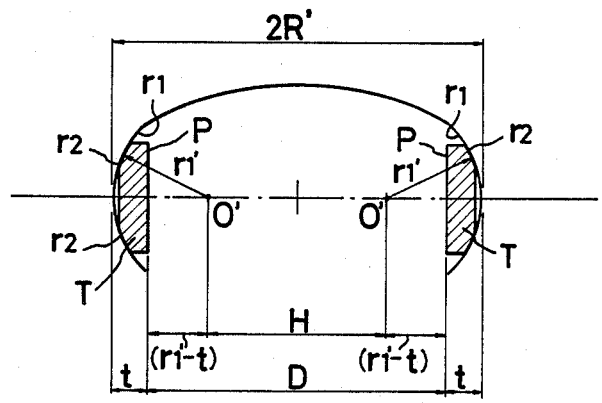

In this type of joint, a substantial maximum joint angle is about 20 degree. If the joint angle $\theta$ is 20°, an inclination angle of the aligning member T becomes about 1.6°. As shown in FIGS. 34 and 35, when the aligning member T is moved about $0'$ and slides by 1.6° along the cylindrical surface $r_1$ (radius $r_1'$), the distance $D'$ between the two plane surfaces P of the aligning member T is expressed as follows.

$$D' = 2(r_1' - t) + H \cos 1.6°$$

wherein $r_1 = R'/2$, $O'O' = H$ and t is a wall thickness of the aligning member T.

Since $D = 2(r_1' - t) + H_1$, a reduced amount or variation of the distance of the two plane surfaces P is expressed as follows.

$$D = D' = H(1 - \cos 1.6°) = 0.0004H.$$

When H = 20 mm in a practical example, $D - D' = 0.008$ mm, so that the variation is very small. Since a difference (initial clearance) between a distance of the two plane surfaces P of the aligning member T and a diameter of the cylindrical roller $R_2$ in a non-tilted state is predetermined much larger than the aforesaid reduced amount. Accordingly, even if the distance be the two surfaces D is reduced, such a phenomenon that the two segments of the aligning member T hold the cylindrical roller $R_2$ forcibly does not occur.

The construction for supporting the aligning member T will be described.

As discussed previously, the aligning member T is disposed with a suitable clearance between the cylindrical surface $r_1$ and the cylindrical surface $r_2$, it is required to maintain a non-load side of the aligning member T in a fixed position so that it cannot be dismounted during the movement of joint. To prevent the aligning member T from being dismounted in a longitudinal direction (axial direction of the housing H), it is preferable to dispose a stopper at an end of the housing H so as to contact an edge of the aligning member T. A radial movement of the aligning member T toward the housing H can be regulated by mutual contact of the cylindrical surfaces $r_1$, $r_2$ respectively since a contact area of the cylindrical surfaces $r_1$, $r_2$ becomes larger in the case they have a relatively smaller radius. In the case the contact area of the cylindrical surfaces $r_1$, $r_2$ is small, it is possible to regulate an outward movement of the aligning member T by making use of a large inner diameter of the groove 11. Further, it is possible to regulate an inward movement of it by disposing a barrier such as a thin metal plate along a small inner diameter of the groove 11. Further, in order that the aligning member T may not be tilted to the inside of the groove 11, it is possible to dispose a hook having the function of stopper as well as tilt at the opening end of the housing H, thereby the hook may be engaged with the plane surface P of the aligning member T. Alternatively, it is possible to dispose a hook on the bottom of the housing H, thereby it can be engaged with the plane surface P of the aligning member T. At any rate, if the aligning member T enables sliding or movement, any arrangement for regulating its movement may be acceptable.

FIGS. 30 and 31 show an example for supporting the aligning member T, in which numeral 16 is a channel extended longitudinally on a center of the plane surface P of each segment of the aligning member T and numeral 17 is a cutaway recess formed on the end of each segment thereof so as to communicate with the channel 16.

Numeral 18 is a U-shaped spring member for connecting the two segments, thereby the aligning member T can be disposed in the groove 11. The depth of the channel 16 is larger than the diameter of the spring member 18. A bent end 18a of the spring member 18 is mounted in the recess 17 and a spring portion 18b is inserted in the channel 16. A bottom portion 18c is supported by a stopper 19 which will be described hereinafter. The spring member 18 is normally of open profile as shown in a chain line of FIG. 31. When compressing it in U-shape, outward spring force is given in advance.

The stopper 19 for supporting the spring member 18 is inserted in a channel 20 formed in a small dimensional surface on the bottom of the housing H. The stopper 19 has three protrusions 19a as shown in FIG. 30, thereby each protrusion 19a can support the bottom portion 18c of the spring member 18.

Under such circumstances, the two segments constituting the aligning member T are firmly associated with each other by springiness of the spring member 18. Compressing such aligning member T from both sides, it is inserted in the groove 11 and temporarily supported therein in moderate contact with the cylindrical surface $r_1$ due to springiness of the spring member 18. Next to this, the stopper 19 is inserted in the channel 20 and the bottom portion 18c of the spring member 18 is supported by the protrusion 19a of the stopper 19. Thus, the aligning member T is firmly fixed, in the groove 11, so that it is feasible to prevent mutual interference of the cylindrical surfaces $r_1$, $r_2$, a longitudinal slipping of the spring member 18 and an inward tilt or slipping of the aligning member. Further, since the spring member 18 is inserted in the channel 16 deeply from the plane surface P of the aligning member T, no interference with the cylindrical roller $R_2$ will occur. Further, even if the aligning member T is tilted, its displacement may be absorbed by resilient deformation of the spring member 18.

The function of the aligning member T will be described.

The axial and angular movement of the housing $H_2$ and the shaft $S_2$ is feasible when the cylindrical roller $R_2$ is moved on the plane surface P of the aligning member T, so that a torque transmission is possible by way of the aligning member T between the cylindrical roller $R_2$ and the groove 11.

As discussed above, according to the fifth embodiment, the aligning member having two separated segments is disposed between the cylindrical roller and the groove of the housing and movable independently in the housing. Further, the aligning member is provided with the plane surface on the contact surface with the cylindrical roller, and the cylindrical roller is movable on the plane surface of the aligning member. Thus, the aligning member can perform an independent aligning function for the joint angle, thereby occurrence of the axial component of force of the joint can be eliminated.

Further, since the aligning member can be disposed as an independent component in the groove of the housing, a combination of the cylindrical surface of the groove with the curved surface of the aligning member may be diversified in view of design.

Still further, since the aligning member has a simple profile, it can be manufactured at a low cost.

Accordingly, it is feasible to obtain a tripod type constant velocity having high accuracy, good performance and long durability.

What is claimed is:

1. A tripod type constant velocity joint comprising:
   a housing including three grooves, each of said grooves having curved surfaces opposing each other in a circumferential direction,
   a shaft inserted into said housing;
   three trunnions mounted on said shaft and each of said trunnions outwardly extending right-angled relative to an axis of said shaft;
   three rollers movably mounted on said three trunnions and fitted in said three grooves;
   an aligning member disposed between each of said three rollers and the curved surfaces of each of said three grooves, with each aligning member having two segments separated from each other and each segment is provided with a channel in a longitudinal direction on a contact plane surface with said cylindrical roller, and each segment being provided with a curved surface on a contact surface with said curved surface of said groove; and
   a U-shaped spring for maintaining said separated segments within said groove being fitted in said channel of each of said two segments.

* * * * *

UNITED STATES PATENT AND TRADEMARK OFFICE
CERTIFICATE OF CORRECTION

PATENT NO. : 4,808,145

DATED : February 28, 1989

INVENTOR(S) : Yasumasa Mizukoshi

It is certified that error appears in the above-identified patent and that said Letters Patent is hereby corrected as shown below:

On the title page, Item [75] should read -- Yasumasa Mizukoshi --.

Signed and Sealed this

Seventh Day of November, 1989

*Attest:*

JEFFREY M. SAMUELS

*Attesting Officer*     *Acting Commissioner of Patents and Trademarks*